United States Patent
Bhattacharyya et al.

(10) Patent No.: US 9,386,092 B1
(45) Date of Patent: Jul. 5, 2016

(54) COST OPTIMIZED EMAIL ATTACHMENT DOWNLOAD IN A MOBILE DEVICE

(71) Applicant: INTERNATIONAL BUSINESS MACHINES CORPORATION, Armonk, NY (US)

(72) Inventors: Anamitra Bhattacharyya, Chemlsford, MA (US); Krishnamohan Dantam, Chelmsford, MA (US); Ravi K. Kosaraju, Pittsford, NY (US); Manjunath D. Makonahalli, Acton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/993,688

(22) Filed: Jan. 12, 2016

(51) Int. Cl.
G06F 15/16 (2006.01)
H04L 29/08 (2006.01)
H04W 12/06 (2009.01)

(52) U.S. Cl.
CPC ............ *H04L 67/104* (2013.01); *H04W 12/06* (2013.01)

(58) Field of Classification Search
CPC . H04L 63/0861; H04L 67/104; H04W 12/06; H04W 12/08
See application file for complete search history.

(56) References Cited

U.S. PATENT DOCUMENTS

| 8,838,071 B1* | 9/2014 | Cronin ................. G06F 3/0482 455/411 |
| 2006/0168012 A1 | 7/2006 | Rose et al. |
| 2008/0028017 A1 | 1/2008 | Garbow et al. |

OTHER PUBLICATIONS

IBM, System and Method for Optimized Mail Attachment Download, IP.com, IPCOM000168598D, Mar. 18, 2008.
Harrison McGonigal, Distributed Download over an Ad-Hoc Network, IP.com, IPCOM000239019D, Oct. 1, 2014.
Manish A Bhide, System and Method for Optimized Mail Attachment Download, Mar. 18, 2008, IP.com.

* cited by examiner

*Primary Examiner* — Yves Dalencourt
(74) *Attorney, Agent, or Firm* — Shimokaji IP

(57) ABSTRACT

A method for reducing data usage for wireless subscription plans. An email and an attachment are downloaded to a first device of a first recipient. An attachment is identified on the email by an attachment processing service that ensures that sharing from the first device is based on a credit policy. That there is more than one recipient for the email and attachment is determined. That a second device of a second recipient is in the vicinity of the first device is determined. Verification of the second device is established with an email fingerprint exchange handshake based on a fingerprint of the email for the second recipient that is computed from a hash of content of the email, an identifier of the attachment, and an email id of the second recipient. A second network is utilized to copy the attachment from the first device to the second device.

1 Claim, 2 Drawing Sheets

COST OPTIMIZED EMAIL ATTACHMENT DOWNLOAD IN A MOBILE DEVICE

BACKGROUND

People are now using mobile telephones to download email attachments using their provider networks. Often times the same attachment gets downloaded by multiple people who are part of the same recipient group. There is no standard way to optimize the download and sharing of this same attachment (or set of attachments). What is needed is a way to recognize this download redundancy and to optimize it to reduce the data usage for mobile telephone users. In the increasingly interconnected world where smart phones are used as a tool for social media, entertainment and office work, the data usage of a phone needs to be optimized to save cost and bandwidth for corporations and users.

SUMMARY

According to one embodiment of the present invention, a method for reducing data usage for wireless subscription plans, comprises downloading an email and an attachment via the wireless subscription plan and a first network to a first device of a first recipient; identifying an attachment on said email by an attachment processing service that ensures that sharing from said first device is based on a credit policy; determining that there is more than one recipient for said email and said attachment; determining that a second device of a second said recipient is in the vicinity of said first device; establishing verification of said second device with an email fingerprint exchange handshake based on a fingerprint of said email for said second recipient that is computed from a hash of content of said email, an identifier of said attachment, and an email id of said second recipient; and utilizing a second network to copy said attachment from said first device to said second device.

DETAILED DESCRIPTION

Figure 1:
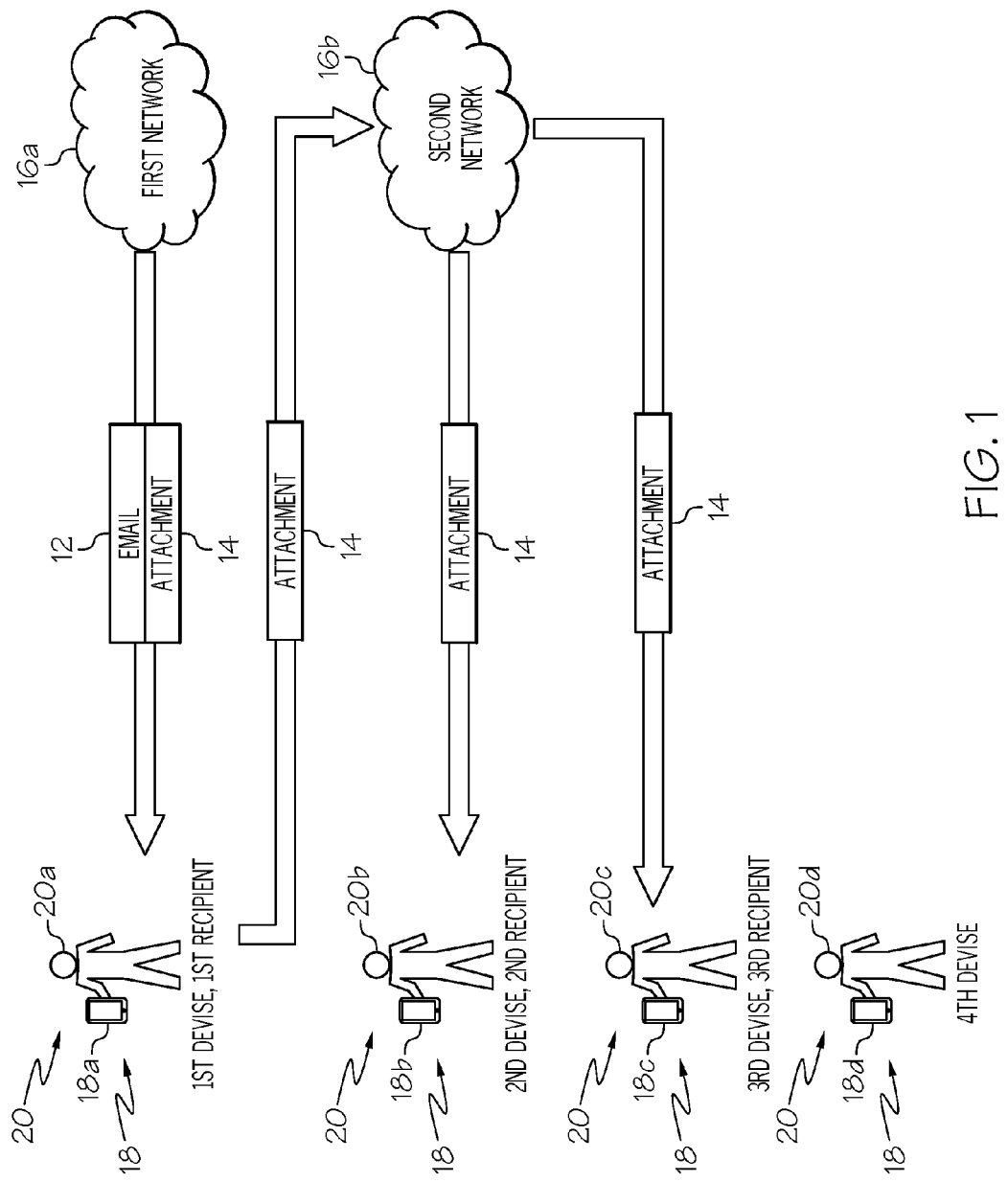
FIG. 1 is a schematic showing a hardware environment employing the present invention.

Broadly, embodiments of the subject technology provide a cost optimized email attachment download in a mobile device. As illustrated in the various drawings herein, and particularly in the view of FIG. 1, the embodiment of the invention is depicted by the general reference character 10.

Referring now to FIG. 1, this is a schematic showing a hardware environment employing the present invention. An email 12 is present with one or more attachments 14. Four devices (devices 18 collectively, devices 18a-d individually) are present that potentially may receive the email 12 and the attachment 14. For the sake of this example, devices 18a-c belong to intended recipients (recipients 20 collectively, recipients 20a-c individually) of the e-mail 12 and the attachment 14. The fourth device 18d belongs to a party not intended to receive the email 12. Finally, the devices 18 communicate via a first network 16a and a second network 16.b This invention optimizes the usage of a data network (first network 16a) of users (recipients 20) downloading an email attachment 14. Bluetooth can be used as an alternate (second network 16b) to using the first network 16a amongst the recipients 20 for sharing attachments 14. For instance, the term "friend device" can be used to denote a mobile device owned by someone trusted by a subject recipient, such that the subject recipient has pre-registered that "friend device" as a bluetooth pair. This invention, however, does not limit itself to bluetooth. Any alternate protocol that does not use the first network 16a can be used.

In this disclosure we introduce an Email Attachment Download Daemon (EADD), which manages the secure and shared download of email attachments 14. All recipients 20 that need to take part in this optimized bluetooth based attachment download need to run this software in their individual devices 18. The EADD is responsible for initiating the handshake between devices 18 and ensuring that the sharing is based on a credit policy, described presently.

Assume that an email 12 with one or more attachments 14 is received by an recipient's 20a device 18a when the device 18a is in the first network 16a. The EADD analyzes the email 12 along with the "to" list to find a list of recipients 20b. If this recipients 20b is the only one, then the EADD would let the recipients 20b download the attachments 14 using the first network 16a, as there is no other "friend" device 18 that could have possibly received this same email 12 and already downloaded the attachment(s) 14.

If there are more than one recipient 20b-c and the device 18a does not detect any "friend" devices 18 in the vicinity, then the EADD will let the recipient 20ba download the attachment(s) 14 using the first network 16a, as there is no other "friend" device 18 in range to request the attachment 14 to download.

In contrast, if there are more than one recipient 20b-c, and the device 18a detects one or more "friend" devices 18b-c in the vicinity, EADD will attempt to map the recipient 20b-c email ids to the discovered "friend" device ids. If no existing match is found, the EADD will initiate an Email Fingerprint Exchange (EFE) handshake with an arbitrarily selected friend device 18 in the vicinity (which may or may not have received the email). If one or more existing matches (of email id to device id) is found, the device 18 would first initiate the EFE handshake with one of the matching devices 18 in vicinity.

The EFE handshake is now described before continuing with the process flow.

The primary objective of the EFE handshake is to establish trust that the device 18b-c on the other side of the communication did receive the same email and is not a device 18d that is trying to impersonate as a "friend" device to gain unauthorized access to email content.

In this process the handshake initiating device 18a (aka source device) would generate a fingerprint of the email 12 for each recipient 20a-c by computing a hash of the email content, attachment names, and the recipient email id. Of all the finger prints generated, the finger print for the current device's 18a recipient id is called the primary finger print. All other recipients 20b-c finger prints are termed "secondary finger prints."

If and when the recipient 20a attempts to download the attachment, the EADD of the source device 18a will send the primary finger print to each of the "friend" devices 18b-c in range.

Each of the devices 18b-c receiving that finger print will match that finger print with the set of finger prints generated by this recipient device for that email. For example, say recipient device is device 18b. If there is a match, device 18b will send its primary finger print to the sender device 18a asking it to verify the same. If there is no match—receiving device 18b will indicate that it did not receive that email 12.

After successful mutual verification using the EFE handshake, the sending device 18a will: (1) Register the email id corresponding to the receiving device with the receiving device id (in case the receiving device email id mapping was not available prior to the EFE handshake). (2) ask the receiving device if it has already downloaded the specific attachment. A "yes" reply would initiate a download of the attachment 14 via the second network 16b from the receiving device to the sending device. A "no" reply would prompt the sending device to re-do the same steps with another "friend" device 18 in the vicinity.

This process is repeated till a "friend" device 18 in vicinity responds with a "yes" or all devices 18 are exhausted (implying all devices replied with a "no"). The "no" can be either because the device 18 did not receive that email 12 or the device 18 did not download that attachment 14 yet.

For the first "yes" reply, a download is initiated. For a "no" reply from all devices 18, the originating device 18 may either: (1) proceed with the download of the attachment 14 by itself. (2) Initiate a "credit policy evaluation" as part of the attachment processing service above to see if there is any eligible "friend" device 18 than would owe a download to this device 18 and that has the implicit download (i.e., download by EADD without the user initiation process) policy turned on.

The credit policy evaluation can work as follows. For each download of attachment from a device B to device A, B would maintain a positive credit with A and A would have a negative credit with B. The EADD would ensure this is updated for every download. The credit is always maintained between two recipients 20/devices 18. This credit can be used in EADD policy settings by individual recipients 20. An example policy might be that: If I have a negative credit with the requesting user and my device data plan is largely un-used (percentage P left) and there are only few days (N days) to go for the plan cycle, then allow implicit downloads.

Figure 2:
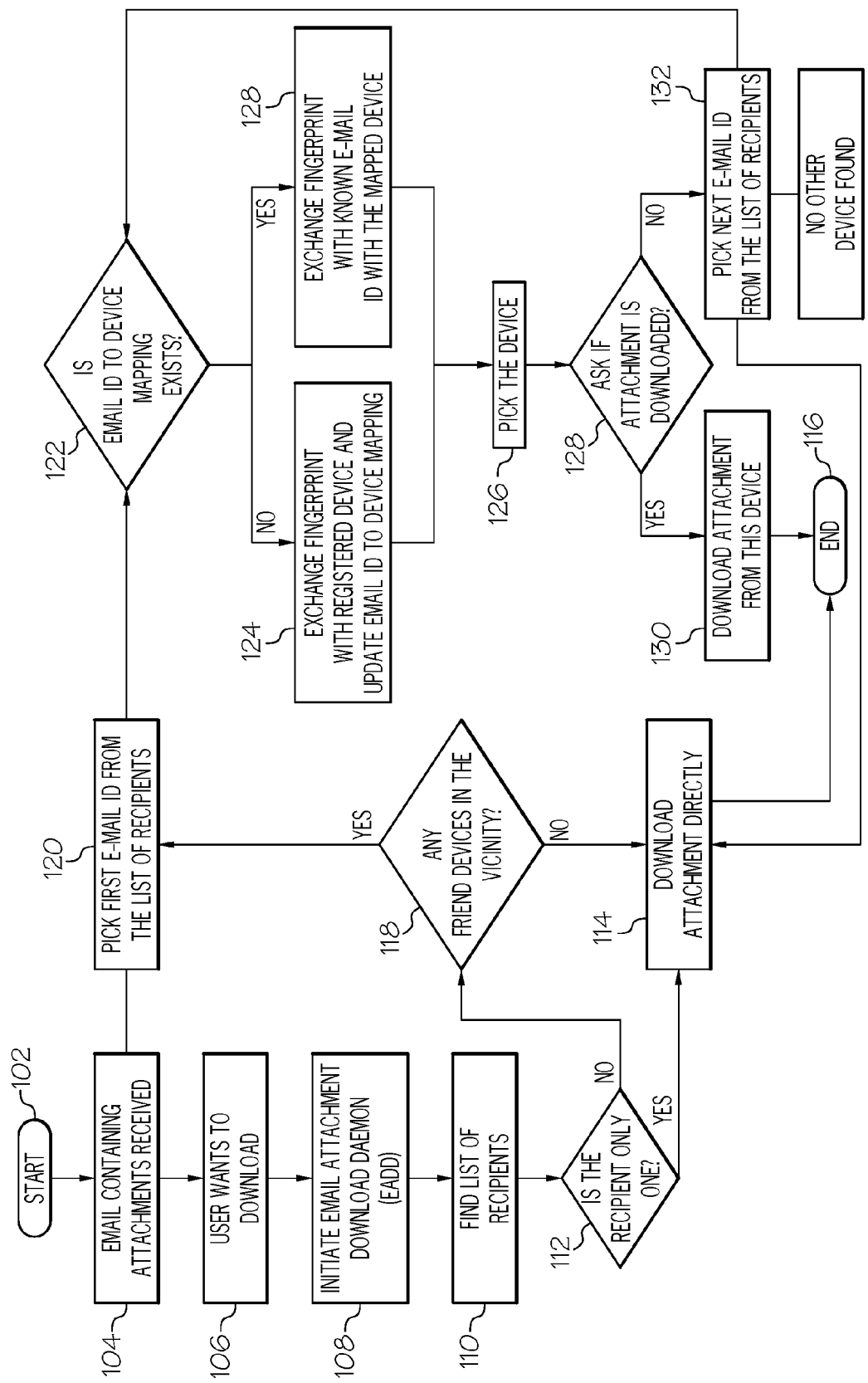
FIG. 2 is a flowchart showing a process for the download of email attachments in accord with the present invention.

Referring now to FIG. 2, this is a flowchart showing a process 100 for the download of email 12 attachments 14 in accord with the present invention. For simplicity, if Bluetooth is used for the second network 16b, it is presumed for the process 100 that at least devices 18a-c are already registered.

The process starts in a step 102. In a step 104 an email 12 containing one or more attachments 14 is received. In a step 106 it is determined that the user (recipient 20, recipient 20a in the example used above) wants to download this email 12 and attachment(s) 14.

In a step 108 the Email Attachment Download Daemon (EADD, described above) is initiated. In a step 110 a list of the intended recipients 20 is found in the email 12 (recipients 20a-c in the example used above).

Next, in a step 112, the current recipient (recipient 20a) is checked to see if it is the only one for the email 12. If so, in a step 114 the device (device 18a) downloads the attachment 14 directly. And in a step 116 the process 100 ends.

Alternately, if in step 112 the current recipient (recipient 20a) is not the only listed one for the email 12, a step 118 follows where it is determined whether any friend devices (e.g., devices 18b-c) are in the vicinity of the device (device 18a) running the EADD. If not, the process 100 performs step 114 (direct download) and step 116 (end).

Alternately, if in step 118 a friend device (e.g., devices 18b-c) is in the vicinity of the device (device 18a) running the EADD, a step 120 follows where the EADD picks the first email id from the list of intended recipients 20 of the e-mail 12.

Next, in a step 122, it is determined whether the email id maps to a device (any of devices 18a-c at this point). If not, in a step 124 the device running the EADD (device 18a) exchanges a fingerprint with the friend device (devices 18b-c) and updates its email id to device mapping. Then, a step 126 follows.

Alternately, if in step 122 the email id does map to a device 18a-c, a step 128 follows where the device running the EADD (device 18a) exchanges a fingerprint with a known email id of an already mapped friend device (devices 18b-c). And then step 126 follows.

In step 126 the EADD picks the mapped device (device 18b-c). And in a step 128 it is determined if the attachment 14 is already downloaded on the device (device 18a) running the EADD. If so, a step 130 follows where the attachment is download (e.g., from device 18a which has the attachment to device 18b or device 18c which does not have the attachment 14). Then step 116 follows where the process 100 ends.

Alternately, if in step 126 the attachment 14 is not already downloaded, in a step 132 the EADD picks the next email id from the list of intended recipients 20 and returns to step 122. And, in the event there are no further email ids in the list of recipients 20, the process returns to step 114.

Summarizing, this invention is based on sharing email attachments with common recipients. It exploits the fact that often people receiving emails are co-located. Mobile devices exchange attachments with trusted devices by mutually authenticating each other using a finger print that will only be known to each other. A key benefit is reduced bandwidth usage of paid network data.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A method for reducing data usage for wireless subscription plans, comprising:
   downloading an email and an attachment via the wireless subscription plan and a first network to a first device of a first recipient;
   identifying said attachment on said email by an attachment processing service that ensures that sharing from said first device is based on a credit policy;
   determining that there is more than one recipient for said email and said attachment;
   determining that a second device of a second said recipient is in the vicinity of said first device;
   establishing verification of said second device with an email fingerprint exchange handshake based on a fingerprint of said email for said second recipient that is computed from a hash of content of said email, an identifier of said attachment, and an email id of said second recipient; and
   utilizing a second network to copy said attachment from said first device to said second device.

* * * * *